G. H. GREGORY.
AXLE LUBRICATOR.
APPLICATION FILED APR. 9, 1912.
1,052,243.
Patented Feb. 4, 1913.
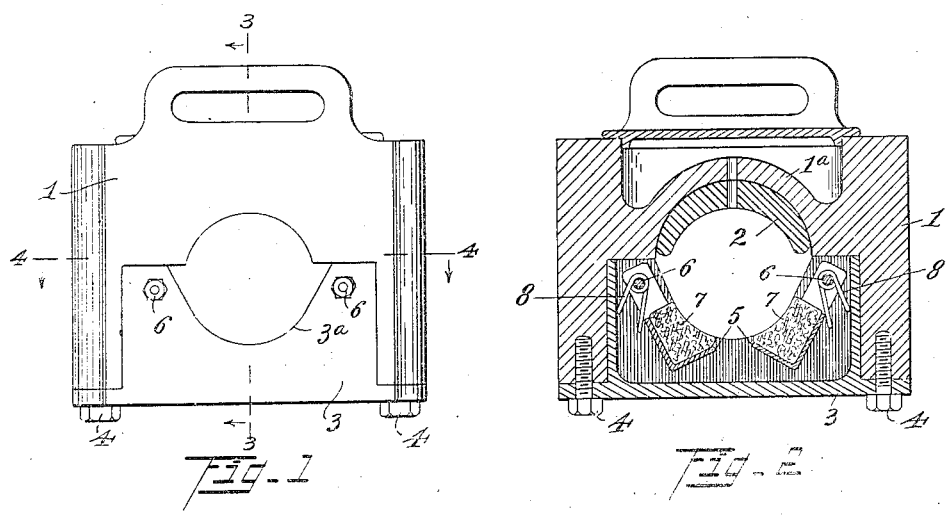
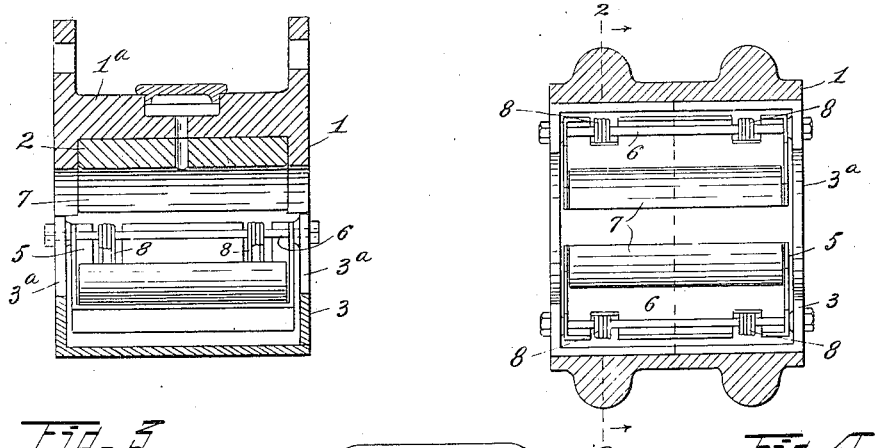
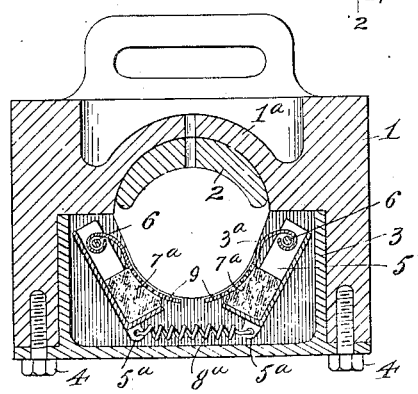
Witnesses:
Inventor
Geo. H. Gregory
Attorney

UNITED STATES PATENT OFFICE.

GEORGE H. GREGORY, OF MOUNT CARMEL, ILLINOIS.

AXLE-LUBRICATOR.

1,052,243.  Specification of Letters Patent.  Patented Feb. 4, 1913.

Application filed April 9, 1912. Serial No. 689,483.

*To all whom it may concern:*

Be it known that I, GEORGE H. GREGORY, a citizen of the United States, residing at Mount Carmel, in the county of Wabash and State of Illinois, have invented certain new and useful Improvements in Axle-Lubricators, of which the following is a specification.

My invention relates to improvements in axle lubricators, and is particularly designed and adapted for use in connection with the journal or axle-boxes of railroad locomotives, cars, and similar or like vehicles.

The primary object of the invention is to provide a generally improved axle or journal lubricator of this class of exceedingly simple, cheap and efficient construction.

A further object of the invention is to provide a lubricating device of this class adapted to use lubricants in various forms, such as relatively hard sticks of lubricant or waste material saturated or impregnated with suitable lubricating oil, and the like.

A still further object is the provision of an excellent lubricator having its parts conveniently arranged and accessible to meet the varying exigencies of actual service.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings forming a part of this specification, Figure 1, is an end elevation of an axle-box lubricator constructed in accordance with my invention. Fig. 2, a cross sectional view of the same, taken on line 2—2 of Fig. 4. Fig. 3, a vertical longitudinal sectional view taken on line 3—3 of Fig. 1. Fig. 4, a horizontal sectional view taken on line 4—4 of Fig. 1. Fig. 5, a cross sectional view showing a slightly modified form of same.

Similar numerals of reference designate like parts throughout all the figures of the drawings.

The improved axle lubricator or lubricating device is adapted for use in connection with an axle-box 1, of any suitable and convenient form, said axle-box being provided with a suitable journal bearing portion 1ª, and a suitable journal brass 2, mounted and secured in any suitable and convenient manner.

The axle-box cellar 3, may be of any suitable and convenient form, and in the present instance, comprises a removable cellar member 3, adapted to be mounted in the lower portion of the axle-box 1, immediately beneath the journal bearing portion thereof and may be suitably connected with the axle-box, as for example,—by means of cap screws 4.

The ends of the cellar member 3, are provided with recess portions 3ª, adapted to receive and contain the axle or journal when the parts are assembled, and as a means for providing a suitable lubricant receptacle in close proximity to the under side of the axle or journal to be lubricated and for carrying and maintaining the lubricant in frictional engagement with the latter, follower pans or receptacles 5, are movably mounted in the axle-box cellar, said follower pans being preferably pivotally and removably mounted in opposite sides of the axle-box cellar by means of axle bolts 6, the lower or free ends of the pans or receptacles 5, being trough-shaped with the open sides thereof in close proximity to the axle or journal to be lubricated, said follower pans being adapted to receive and contain a suitable lubricant 7, which may be in stick form to fit the follower pans as illustrated in Figs. 2, 3, and 4, or if desired, may be in oil or liquid form carried in suitable waste material 7ª, as illustrated in Fig. 5, of the drawings.

As a means for holding and carrying the free sides of the pivotally mounted follower pans or receptacles toward the underside of the journal or axle or moving the same upwardly and inwardly from the bottom portions of the axle-box cellar whereby the lubricant will be held and advanced toward the axle or journal, suitable spring members may be employed, as for example,—such as the spring members 8, shown in Figs. 2, 3, and 4, or if desired, a connecting spring 8ª, such as shown in Fig. 5, may be used, the spring 8ª, in the latter instance, being connected to lugs 5ª, at the lower free ends of the follower pans, and serving to draw the latter toward each other and upwardly and inwardly with respect to the axle or shaft.

In the form shown in Fig. 5, of the drawings, curved axle follower members 9, in the form of perforated or foraminous plates are mounted in the open sides of the follower pans, said follower members 9, serving as lining members adapted to bear against the under side of the axle or journal and above the oil saturated or impregnated waste or packing material 7ª, the lubricant being adapted to be fed through the openings in the axle follower or lining members 9.

From the foregoing description, taken in connection with the accompanying drawings, the operation and advantages of my invention will be readily understood.

Having thus described some of the embodiments of my invention, what I claim and desire to secure by Letters Patent is,—

1. An axle lubricator, comprising an axle box, a journal bearing, an axle box cellar removably mounted within and covered by said axle box, axle bolt members removably mounted in said axle box cellar at opposite sides of said journal bearing and extending parallel therewith, follower pans mounted on said axle bolts and having their open portions below said journal bearing, and springs mounted on said axle bolt members and connected to said follower pans whereby the latter are moved inwardly and upwardly beneath said journal bearing.

2. An axle lubricator, comprising an axle box, a journal bearing, an axle box cellar fitted within and forming the bottom portion of said axle box, the ends of said cellar being provided with journal receiving recesses and extending flush with said axle box, pivot bolt members removably mounted in the ends of said axle box cellar, follower pans mounted on said pivot bolts in opposite sides of said cellar, spring members connected to the free ends of said follower pans, and curved perforate axle follower members mounted on said pivot bolts and within the open sides of said follower pans.

3. An axle lubricator, comprising an axle-box a journal bearing at its top, an axle-box cellar removably mounted in and forming the bottom of said axle-box beneath said journal bearing, axle bolt members removably mounted in said axle-box cellar at opposite sides of said journal bearing, spring actuated follower pans mounted on said axle bolts, and spring mechanism for moving said follower pans toward said journal bearing.

In testimony whereof I have affixed my signature in presence of two witnesses.

GEORGE H. GREGORY.

Witnesses:
WM. STEIN,
BEN H. TOWNSEND.